June 27, 1950     H. N. FAIRBANKS     2,513,085
CONSTANT TENSION DEVICE FOR FEEDING
STRIPS SUCH AS FILM
Filed May 1, 1947
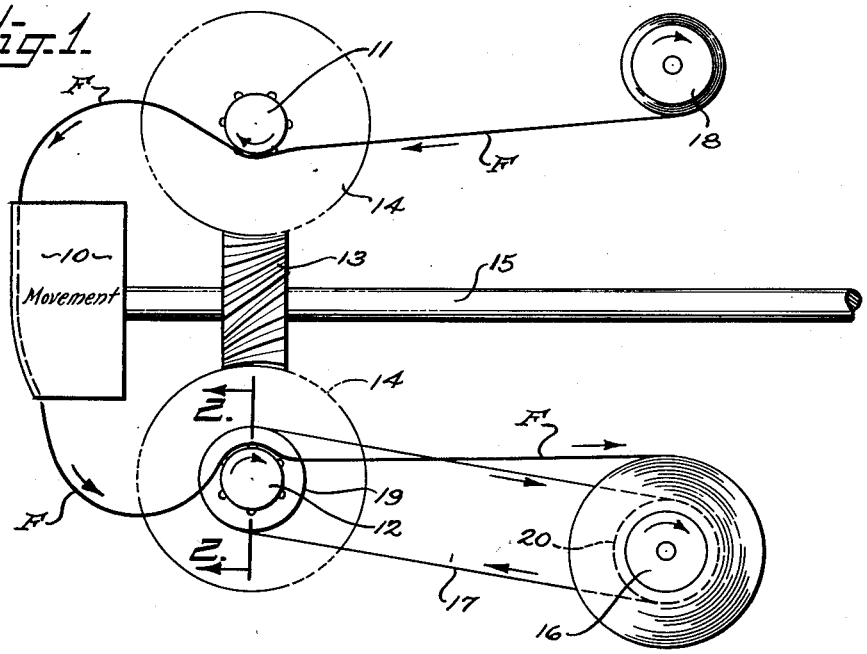
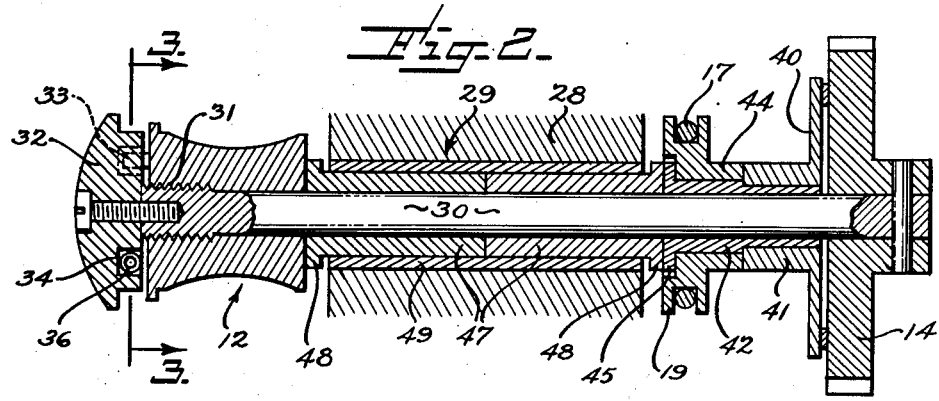
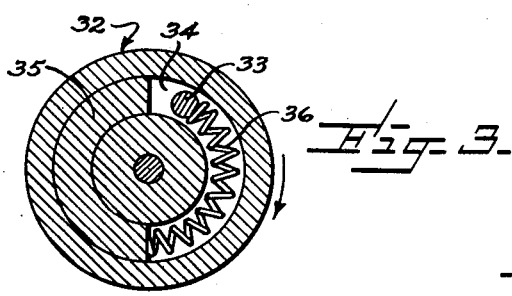
Inventor
Henry N. Fairbanks
Bakelew & Sawtlebury
Attys Patented June 27, 1950

2,513,085

UNITED STATES PATENT OFFICE 2,513,085

CONSTANT TENSION DEVICE FOR FEEDING STRIPS SUCH AS FILM

Henry N. Fairbanks, Brighton, N. Y., assignor to Mitchell Camera Corporation, Glendale, Calif., a corporation of Delaware Application May 1, 1947, Serial No. 745,265

11 Claims. (Cl. 242—55)

This application is a continuation in part of my application Ser. No. 618,161, filed September 24, 1945, now abandoned.

The general purpose and objective of this invention is to provide an automatically acting means whereby uniform tension is maintained upon a film or the like by a take-up or similar device. Although the invention is applicable and useful in any type of mechanism where a long strip is fed from or taken up by a winding reel, the present illustrative and preferred form of the invention has been designed particularly in use in kinetograph mechanisms for taking up motion picture film. The invention will therefore be described primarily as applied to that use, but without implying limitation thereto.

Devices have been proposed for the purpose of maintaining uniform take-up tension on a film, but as far as is known, only one previous type of device has regulated the tension on the film under direct control of the tension itself, all other previous devices depending for actuation and control on other factors such as the weight or size of the instant coil film on the take-up reel. The one previous type which utilizes the film tension for purposes of control, employs an idler roller hanging in a loop of film between the take-up spool and a positive film feeding roll. The weight of the idler roller, or downwardly exerted spring pressure on it, establishes tension on the film in the loop. And movement of the roller with variations in loop length is then utilized through leverage or similar connections to control a frictional clutch through which the take-up reel or spool is over-driven.

The present invention provides a much more simple and dependable operating means, controlled directly by the film tension itself, to maintain the tension constant. How that is done and the nature of the invention itself, will be best understood from the following detailed description of a present preferred and illustrative form which is shown in the accompanying drawings, in which:

Fig. 1 is a diagram showing the general arrangement of a typical kinetograph mechanism to which the invention is applied;

Fig. 2 is an enlarged section taken as indicated by line 2—2 of Fig. 1, and

Fig. 3 is a section taken as indicated by line 3—3 on Fig. 2.

The diagram of Fig. 1 shows a film movement 10 and two film feeding sprockets 11 and 12 which are driven by gearing 13, 14 from driving shaft 15. Take-up spool 16 is shown as being driven by a belt 17 from the shaft of take-up sprocket 12, while supply spool 18 is shown as being free to rotate as film F is pulled off of it. The driving belt 17 for the take-up spool 16 operates over a pulley 19 on the shaft of sprocket 12 and a pulley 20 on the shaft of take-up spool 16. The ratio of that belt drive is such that, with pulley 19 rotating at the full speed of sprocket 12, take-up spool 16 is overdriven. Commonly some kind of a simple frictional slip is provided in that overdrive, but with a slippage at any given torque the tension on film F varies inversely with the diameter of the roll of film on the take-up spool. In the present invention (as applied to take-ups) the ratio of the take-up drive is such as to overdrive the spool at all times, and at present a belt drive is utilized. The controlled slippage of a preferred form of the invention does not, however, utilize slippage in the belt drive itself. Accordingly the belt drive may be considered as typical of any suitable driving connection of the proper ratio.

For the purpose of description, but without limitation, it will be assumed that when film F is fed forwardly through the mechanism and taken up on the take-up spool, the relative directions of movement of the various parts are as indicated by the several arrows in Fig. 1. Thus it will be assumed that the sprocket 12, from which film F goes directly to take-up spool 16, is rotating clockwise in Fig. 1.

In Fig. 2 shaft 30 of spool 12 is shown mounted in a bearing 29 (details explained hereinafter), that bearing being mounted in a stationary member 28 which may be understood to be a part of the frame or a part of a fixed mounting plate in the mechanism. As here shown, sprocket 12 is mounted on shaft 30 through a threaded engagement at 31, so that the sprocket, except for restraints and limits which will be described, is freely rotatable with reference to the shaft. At the outer end of shaft 30 a head 32 is fixedly mounted on the shaft to rotate therewith at all times. A pin or lug 33, fixedly mounted on the outer face of sprocket 12, projects into a circular groove 34 formed in the inner face of head 33. This circular groove 34 is provided with a pair of stops which are most conveniently formed by the ends of a semi-circular block 35 set in groove 34. And a compression spring 36 lies in groove 34 with its opposite ends bearing against pin 33 and one end of block 35.

From a reference to Fig. 1 it will be seen that the take-up tension which is exerted on film F by spool 16 is a tension which tends to rotate sprocket 12 in the same direction as that in which it is being rotated by the driving mechanism. Take-up spool 16 being frictionally overdriven, the take-up tension on film F tends to pull sprocket 12 ahead. In the particular arrangement shown in the drawings that direction is clockwise in Figs. 1 and 3. The tendency to pull the sprocket ahead clockwise moves pin 33 in a direction to compress spring 36; and spring 36 is chosen of a strength to correspond with the take-up tension desired to be applied to film F. Consequently, when the desired tension, or approximately that desired tension is applied to the film, spring 36 will be compressed by relative forward rotation of sprocket 12. The relative forward movement of film F which accompanies the relative forward rotation of the sprocket, is accommodated by the free loop of film between the movement mechanism 10 and sprocket 12. As the take-up tension on film F increases sprocket 12 will be rotated further in clockwise direction with reference to shaft 30, compressing spring 36 further; and as the tension decreases the sprocket will be rotated counter-clockwise with reference to shaft 30 by spring 36.

Driving gear 14 for sprocket 12 is here shown as mounted in its usual position on the other end of shaft 30 and rigidly affixed thereto, so that the gear drives head 32 positively in clockwise direction as viewed in Figs. 1 and 3. Inwardly of driving gear 14 and adjacent its inner face, there is a friction disk 40 which is here shown as carried by a sleeve hub 41 mounted upon another sleeve 42 which in turn is mounted directly on shaft 30. The belt driving pulley 19 is also here shown as having a sleeve hub 44 which is mounted on sleeve 42. For the purpose of this invention friction disk 40 and pulley 19 may be considered as being rotatively fixed to each other. It is only necessary that pulley 19 be driven from friction disk 40 in the direction proper to drive take-up reel 16, which is here assumed to be clockwise as viewed in Figs. 1 and 3. For the purpose of the present invention, friction disk 40 and pulley 19 may be regarded as rotationally affixed to each other in any manner which provides for the drive of pulley 19 from friction disk 40. Thus, the friction disk and the pulley may be regarded as being both tightly set on sleeve 42 or, equivalently, hubs 41 and 44 and sleeve 42 may be regarded as integral. And, whatever the arrangement may be to rotatively connect 41 and 44, the friction disk and pulley are freely rotatable with reference to shaft 30 except for the torque which is applied from the face of gear 14 through the friction disk. Thus, illustratively sleeve 42 on which both the friction disk and pulley are tightly set, may be regarded as being freely mounted on shaft 30.

Sleeve 42 is preferably shouldered at 45 and bears against an outer end of one of two bearing sleeves 47 which abut each other at their inner ends. These sleeves have flanges 48 at their outer ends which confine the whole shaft mounted mechanism longitudinally with relation to frame plate 28 but which preferably do not frictionally engage the faces of plate 28 or the ends of bearing liner 49. The two bearing sleeves 47 act as a spacer between the inner face of sprocket 12 and the inner face of the unit which carries friction disk 40.

In the operation of the mechanism, gear 14, shaft 30 and sprocket head 32 are driven at uniform rotational speed in the assumed clockwise direction as viewed in Figs. 1 and 3. For that particular direction of rotation, the screw-threads at 31 are lefthanded, so that an increase in tension on film F which tends to rotate sprocket 12 clockwise in Fig. 1 with relation to shaft 30 will, by the screw-thread action, move sprocket 12 toward the left in Fig. 2 relative to shaft 30, or will allow shaft 30 to move relatively to the right in Fig. 2. Conversely, as the tension in film F decreases, spring 36 will move sprocket 12 counterclockwise in Fig. 1 with relation to shaft 30 and will thus draw shaft 30 relatively toward the left in Fig. 2. Friction disk 40 being fixedly spaced from sprocket 12, the forced movement of shaft 30 and gear 14 toward the left with relation to the sprocket, when the film tension decreases, causes an increase in the frictional pressure between gear 14 and friction disk 40, to cause an increase in the driving torque applied to belt pulley 19 and therefore to cause an increase in the tension on the film. And when the sprocket moves relatively counter-clockwise due to decreasing film tension, allowing shaft 30 and gear 14 to move relatively to the right in Fig. 2, the frictional pressure, and the tension on film F, are correspondingly relieved. The tension on the film is thus kept substantially uniform.

In normal operation pin 33 floats between such a position as shown in Fig. 3 and a position further around to the right, but without either contacting block 35 or fully compressing spring 36. By proper choice of the pitch of screw 31 a sufficient variation of the frictional torque at the friction faces may be obtained to compensate for the varying diameter of the coil of film on the take-up spool, without pin 33 either abutting the stop block 35 or abutting the effective stop of the fully compressed spring.

The foregoing describes the operation of the constant tension device as applied to a take-up reel or spool. Application to a pay-out or supply spool can now be shortly described and easily understood. For this purpose it will be assumed that the system shown in Fig. 1 is operated in the direction opposite to that previously discussed, the film now moving upwardly through movement 10, spool 16 now being the supply spool, and it and sprocket 12 now rotating counterclockwise. If now spool 16 is retarded in rotation a drag will be exerted on film F to put it in tension corresponding to the amount of retarding drag placed on the spool. That retarding drag can now be obtained, in the mechanism as here shown, by the simple expedient of making the drive (17, 19, 20), from sprocket shaft 30 to spool 16, of proper ratio to underdrive rather than over-drive the spool. It may be noted that in either case (film being fed either to spool 16, or from that spool) the arrangement tends to rotate spool 16, relative to the rotation of shaft 30 and sprocket 12, in such a direction as to tend to pull the film from sprocket 12 toward spool 16. The force of that tendency, in either case, is the torque transmitted by the friction clutch; an overdriving torque where spool 16 is taking up film, and a dragging torque where the spool is paying out film.

With spool 16 operating to pay out film as described, the mechanism operates to maintain an even tension on the film without any change other than that stated. Regardless of the now reversed direction of rotation of shaft 30 and sprocket 12, increased tension or pull on the film from spool 16 will rotate sprocket 12 clockwise with relation to shaft 30, and decreased tension will allow spring 36 to rotate the sprocket counterclockwise with relation to the shaft. These relative rotations are the same as before described, and cause the same controlled adjustments of the torque transmitted by clutch plate 14, to keep the film tension uniform in the same manner.

A few final observations on the described mechanisms will make their functions more clear and explain the definitive expressions used in the following claims.

In the preferred form of the mechanism as here set out, sprocket 12 performs two distinct functions: (a) that of applying the force of spring 12 to put a predetermined tensional pull on the run of the film between the sprocket and the spool, in a direction tending to pull the film toward the sprocket and away from the spool; and (b) that of controllably adjusting the clutch torque by reason of the relative rotation of the sprocket on its shaft.

The first function might be performed by means known to the art, leaving only the second to be performed by sprocket 12. For instance another positively driven film-feeding sprocket could be placed to the left of sprocket 12 in Fig. 1 and a depending loop between the sprockets would support a weighted or spring loaded idler roller. With spring 36 removed from sprocket 12, the loaded loop would then exert the predetermined tensional yielding pull on the film at sprocket 12, and thus exert a corresponding torque on the sprocket, by exerting that tensional pull on the film to the left of the sprocket 12. And it will be observed that, in the preferred form of the mechanism, the spring 36 performs the same functions; it exerts a yielding torque on the sprocket, and thereby exerts a corresponding yielding tension on the film at the sprocket.

Such an arrangement with division of the two functions, although within the broader aspects of the invention, is not preferred. The preferred arrangement with sprocket 12 performing both functions is much simpler and much less liable to disorder and malfunctioning.

The friction clutch represents any suitable form of slippage element capable of transmitting a controllably adjustable torque. Functionally it may be located physically any place in the overdrive or drag which controls the rotation of the spool. Its preferred location however is directly on the shaft of sprocket 12, as that location allows of its control in a very simple manner by the relative rotation of the sprocket on its shaft.

I claim:

1. A constant tension device for mechanisms in which a strip is moved between a roll, which engages the strip non-slippingly, and a spool on which the strip is wound in a spiral coil of varying diameter; said constant tension device comprising a driven roll shaft with relation to which the roll is relatively rotatable, yielding means which exerts on the strip at the roll a predetermined and substantially constant tension and in a direction tending to pull the strip from the spool and tending to rotate the roll relative to its shaft in the corresponding direction, means which tends to cause rotation of the spool relative to rotation of the roll shaft in a direction tending to pull the strip from the roll to the spool and tending to rotate the roll relative to its shaft against said predetermined tension, said means including a slippage unit whose transmitted torque is adjustable, and means whereby the rotation of the roll relative to its shaft controllably adjusts the torque transmitted by the slippage unit.

2. A constant tension device as defined in claim 1, and in which the yielding means which exerts a predetermined tension on the film comprises a resilient element acting between the roll and its shaft and tending to rotate the roll relative to its shaft in a direction tending to pull the strip from the spool.

3. A constant tension device as defined in claim 2, and in which the means tending to cause rotation of the spool relative to rotation of the roll shaft comprises a rotary transmission element freely mounted on the roll shaft and connected to the spool to rotate it, and a frictional clutch acting between the roll shaft and the transmission element, one member of the frictional clutch being mounted on the roll shaft; and in which the means for controllably adjusting the transmission torque of the frictional clutch comprises a screw-threaded mounting of the roll on its shaft, whereby relative rotation of the roll on its shaft causes relative longitudinal movement of the shaft and the frictional clutch member.

4. A constant tension device as defined in claim 1, and in which the means tending to cause rotation of the spool relative to rotation of the roll shaft comprises a rotary transmission element freely mounted on the roll shaft and connected to the spool to rotate it, and a frictional clutch acting between the roll shaft and the transmission element, one member of the frictional clutch being mounted on the roll shaft; and in which the means for controllably adjusting the transmission torque of the frictional clutch comprises a screw-threaded mounting of the roll on its shaft, whereby relative rotation of the roll on its shaft causes relative longitudinal movement of the shaft and the frictional clutch member.

5. A constant tension device for mechanisms in which a strip is moved between a roll, which engages the strip non-slippingly, and a spool on which the strip is wound in a spiral coil of varying diameter; said constant tension device comprising, a roll driving shaft on which the roll is mounted for relative rotation and with means for causing relative longitudinal movement between the roll and shaft by virtue of such relative rotation, a yielding drive transmission element acting between the shaft and the roll, said element yielding to tension exerted on the strip from the spool with resultant rotation and longitudinal movement of the roll relative to the shaft, a transmission between the shaft and the spool tending to cause rotation of the spool relative to rotation of the roll shaft in a direction tending to pull the strip from the roll to the spool, said transmission element including a slippage element of adjustable torque transmission mounted on the shaft, and means whereby the relative longitudinal movement of the roll on the shaft controllably adjusts the transmission torque of the slippage element.

6. A constant tension take-up device for mechanisms in which a strip is fed forwardly by a constantly driven roll and is taken up from the roll by, and wound in a spiral coil of varying diameter on, a take-up spool; said take-up device comprising, a roll driving shaft on which the feed roll is screw-threadedly mounted, a yielding drive transmission element acting between the driving shaft and the roll, said element yielding to tension exerted on the strip by the take-up spool with resultant rotation and longitudinal translation of the roll relative to the driving shaft, and an overdriving transmission between the driving shaft and the take-up spool including a rotary transmission element freely mounted on the driving shaft, and frictional clutch means acting between the driving shaft and the transmission element and actuated by the relative longitudinal movement of the roll and the shaft.

7. A take-up device as defined in claim 6, and including a roll driving head fixed on an end of the shaft and having an inner face opposing an end face of the roll, said head having an ended annular groove in its said face, and in which the yielding drive transmission element includes a lug projecting from the roll face into the annular groove, and a spring in said groove confined between a groove end and the lug.

8. A take-up device as defined in claim 6, in which there is a driving gear rigidly mounted on the driving shaft, and in which the driving transmission between the driving shaft and the take-up spool includes a frictional disk fixed with reference to the rotary transmission element and presenting a frictional face to a face of the driving gear, and a spacer sleeve between the roll and the friction disk to transmit longitudinal thrust to the latter.

9. A constant tension take-up device for mechanisms in which a strip is fed forwardly by a constantly driven roll and is taken up from the roll by, and wound in a spiral coil of varying diameter on, a take-up spool; said take-up device comprising, a roll driving shaft on one end of which the feed roll is screw threadedly mounted, a yielding drive transmission spring acting between the roll and the driving shaft, a bearing in which an intermediate portion of the driving shaft is journalled, a thrust sleeve freely surrounding the shaft and extending through said bearing and having an end in contact with the inner end of the roll, a driving gear fixedly mounted on the opposite end of the shaft and spaced from the other end of the sleeve, and an overdriving transmission between the driving shaft and the take-up spool including a unit freely mounted on the driving shaft between the driving gear and the last mentioned end of the sleeve, said unit including a friction disk presenting a friction face to the inner face of the driving gear, and a rotary transmission element which is rotatively fixed with reference to the friction disk.

10. A constant tension device for receiving a strip which is fed forward to it from a strip supply at a positively determined supply speed, said device comprising a shaft and a roll rotatably mounted with respect to said shaft and adapted to engage the strip non-slippingly, driving means for positively driving said shaft at a speed directly proportional to the strip supply speed and in such direction that when the strip in engagement with the roll is moving forward at the said supply speed the shaft and roll maintain a constant rotational relation, a winding spool adapted to receive the strip from the roll, yielding power transmission means which exerts on the spool a variable torque tending to wind the strip thereon, transmission control means acting to vary the said torque in accordance with variations in the rotational relation of the roll and shaft, and yielding means which exerts on the roll a predetermined and substantially constant torque tending to rotate it relative to the shaft in a relatively rearward direction.

11. A constant tension device as defined in claim 10 and in which the said yielding means comprises a yielding force exerting element acting between the roll and the shaft.

HENRY N. FAIRBANKS.

REFERENCES CITED

The following references are of record in the file of this patent:

UNITED STATES PATENTS

| Number | Name | Date |
| --- | --- | --- |
| 2,075,457 | Nye | Mar. 30, 1937 |